United States Patent Office 3,303,005

Patented Feb. 7, 1967

3,303,005

TERNARY SEMICONDUCTOR COMPOUNDS AND METHOD OF PREPARATION

Lawrence Suchow, Yonkers, N.Y., assignor to International Business Machines Corporation, New York, N.Y., a corporation of New York No Drawing. Filed Dec. 3, 1962, Ser. No. 241,505
9 Claims. (Cl. 23—367)

This invention relates to new ternary semiconducting compounds and their method of preparation, more particularly to semiconducting devices containing these compounds.

There has been discovered a new group of semiconducting compounds having the composition $Cd_4Y_2X_3$ in which X is an element selected from the halogen subgroup of Group VII of the Periodic Table and Y is an element selected from the post-transition subgroup of Group V of the Periodic Table. The halogen subgroup of Group VII comprises the elements F, Cl, Br, and I. The post-transition subgroup of Group V comprises the elements N, P, As, Sb and Bi.

The new ternary compounds possess semiconducting properties of interest from a device standpoint. These materials have energy gaps such that they are useful in the construction of common semiconductor devices such as rectifiers and transducers, and in photodevices such as detectors of visible light and infrared. Generally, these ternary compounds are all cubic and isomorphous with each other. Their lattice constants vary with the sizes of the component atoms. The crystal structure is based on nearly face-centered cubic cadmium atoms in a pseudo-cell having half the edge of the true primitive cell. All are n-type semi-conductors unless doped to be p-type.

It is an object of the invention to provide $Cd_4Y_2X_3$ compounds which have semiconducting properties.

Another object of the invention is to provide a $Cd_4Y_2X_3$ semiconductor device.

A further object of the invention is to prepare $Cd_4Y_2X_3$ semiconducting compounds.

The foregoing objects, features and advantages of the invention will be apparent from the following more particular description of the preferred embodiments of the invention.

New ternary semiconducting compounds $Cd_4Y_2X_3$, in which X is an element selected from the halogen subgroup of Group VII of the Periodic Table and Y is an element selected from the post-transition subgroup of Group V of the Periodic Table, are best prepared in the following manner. $Cd_3Y_2$ in which Y is an element selected from the post-transition subgroup of Group V of the Periodic Table, and $CdX_2$ in which X is an element of the halogen subgroup of Group VII of the Periodic Table are reacted to synthesize $Cd_4Y_2X_3$ according to the following reaction: $9CdX_2+5Cd_3Y_2+2Y \rightarrow 6Cd_4Y_2X_3$. The $Cd_3Y_2$ starting materials were prepared by the reaction of stoichiometric quantities of extremely pure powders of the constituent elements in evacuated sealed quartz tubes. The powdered mixtures of 3Cd+2Y were brought up to temperature gradually and kept at the maximum for several hours, e.g. the maximum for $Cd_3P_2$ was 750° C. and for $Cd_3As_2$ 700° C. The cadmium halides used were the best laboratory grades commercially available. Actually, preparations of $Cd_4Y_2X_3$ can also be made from stoichiometric quantities of the elements or any mixture of elements and compounds which provides stoichiometric amounts. When quantities of $Cd_3Y_2$ and cadmium dihalides indicated by the above chemical equation were heated together in an evacuated sealed quartz tube at about 500°–550° C., the new ternary compounds were formed. If the tube is heated uniformly, the reaction product is in the form of powder. If it is placed in a temperature gradient so that the mixture is heated at 500–550° C., single crystals of $Cd_4Y_2X_3$ form at the empty cooler end (about 528° C.) of the quartz tube. By means of X-ray diffraction it was determined that all the new compounds are isomorphous, that the structure is cubic with space group Pa3. In addition, some of the lattice constants were obtained.

Examples of lattice constants of some of the new compounds:

TABLE I

| Compound | Lattice constant, A. |
|---|---|
| $Cd_4P_2Cl_3$ | $12.15_6$ |
| $Cd_4P_2Br_3$ | $12.33_2$ |
| $Cd_4P_2I_3$ | $12.73_6$ |
| $Cd_4As_2Br_3$ | $12.64_0$ |
| $Cd_4As_2I_3$ | $13.02_0$ |

The qualitative relationship between the anionic size and the lattice constant is quite apparent, i.e. the lattice constant increases with increasing atomic or ionic size of Y and X. All the new compounds appear to melt incongruently below 600° C. None of the ternary compounds are attacked by either water or benzene at room temperature.

Electrical and optical measurements were made on some of the compounds and the results are shown in Table II below.

TABLE II.—ELECTRICAL AND OPTICAL PROPERTIES OF THE NEW COMPOUNDS

| Compound | Color at 24° C. | Absorption edge (A) at 24° C. | Optical band gap (ev.) at 24° C. | Electrical band gap (ev.) |
|---|---|---|---|---|
| $Cd_4P_2Cl_3$ | Orange | 5,725 | 2.17 | 2.24 |
| $Cd_4P_2Br_3$ | do | 5,650 | 2.19 | 1.80 |
| $Cd_4P_2I_3$ | do | 5,725 | 2.17 | 1.76 |
| $Cd_4As_2Br_3$ | Dark red | 6,950 | 1.78 | 1.88 |
| $Cd_4As_2I_3$ | Red | 6,550 | 1.89 | 2.30 |

All the ternary compounds were deeply colored because the absorption edges fall in the visible portion of the spectrum. Upon heating the new compounds, their color shifts to considerably longer wavelengths. The absorption edges were determined with a Beckman DU Spectrophotometer with diffuse reflectance attachment.

The electrical conductivity was measured on ¼ inch diameter cylindrical pellets formed by pressing powder at 40,000 lbs./in.$^2$. Silver paste electrodes were applied to the two flat surfaces of the pellet which was then placed between half-inch diameter discs of platinum foil. This assembly was then placed between plates in a gold plated brass cell. Pressure contact was maintained by means of a metal spring and an adjustable screw forcing the plates together. Insulation between the electrodes was achieved with high resistance ceramic and with quartz. The cell was fitted so that dry nitrogen could be led through it while measurements were being made. The entire cell was then placed in a tube furnace whose temperature could be varied as required, and D.C. conductivity was measured from about 24° to 350° C. Dember effect measurements at room temperature show all the new compounds to be n-type semiconductors.

The specific examples set forth below illustrate the preparation of the new ternary semiconducting compounds for the formula $Cd_4Y_2X_3$ in which X is an element selected from the halogen subgroup of Group VII of the Periodic Table and Y is an element selected from the post-transition subgroup of Group V of the Periodic Table.

*Example 1*

1.0890 gm. of $CdBr_2$, 0.8872 gm. of $Cd_3P_2$ and 0.0275 gm. of P were mixed and ground together in a ball mill.

The ground mixture was then sealed in vacuum in a quartz tube. The tube was placed in a furnace and heated for 16 hours at 525° C. The ternary semiconducting compound $Cd_4P_2Br_3$ was formed (2.0037 gms.).

The process of Example 1 is repeated in the following examples except that the following reactants in the amounts indicated are used under the conditions stated and the ternary compound set forth is formed.

*Examples 2–12*

| Example No. | Reactants (gm.) | Conditions | Ternary Compound (gm.) |
|---|---|---|---|
| 2 | 1.4666 gm. $CdCl_2$<br>1.7742 gm. $Cd_3P_2$<br>0.0550 gm. P | 500° C., 24 hrs. | 3.2958 gm. $Cd_4P_2Cl_3$ |
| 3 | 1.4647 gm. $CdI_2$<br>0.8872 gm. $Cd_3P_2$<br>0.0275 gm. P | 550° C., 3 hrs. | 2.3794 gm. $Cd_4P_2I_3$ |
| 4 | 1.0890 gm. $CdBr_2$<br>1.0823 gm. $Cd_3As_2$<br>0.0666 gm. As | 550° C., 2 hrs. | 2.2379 gm. $Cd_4As_2Br_3$ |
| 5 | 1.4650 gm. $CdI_2$<br>1.0823 gm. $Cd_3As_2$<br>0.0666 gm. As | 500° C., 18 hrs. | 2.6139 gm. $Cd_4As_2I_3$ |
| 6 | 0.7332 gm. $CdCl_2$<br>1.0823 gm. $Cd_3As_2$<br>0.0666 gm. As | 550° C., 24 hrs. | 1.8821 gm. $Cd_4As_2Cl_3$ |
| 7 | 1.6499 gm. $CdCl_2$<br>2.9038 gm. $Cd_3Sb_2$<br>0.2435 gm. Sb | 500° C., 24 hrs. | 4.7972 gm. $Cd_4Sb_2Cl_3$ |
| 8 | 2.4502 gm. $CdBr_2$<br>2.9038 gm. $Cd_3Sb_2$<br>0.2435 gm. Sb | 525° C., 16 hrs. | 5.5975 gm. $Cd_4Sb_2Br_3$ |
| 9 | 3.2963 gm. $CdI_2$<br>2.9038 gm. $Cd_3Sb_2$<br>0.2435 gm. Sb | 525° C., 8 hrs. | 6.4436 gm. $Cd_4Sb_2I_3$ |
| 10 | 1.6499 gm. $CdCl_2$<br>3.7762 gm. $Cd_3Bi_2$<br>0.4180 gm. Bi | 550° C., 3 hrs. | 5.8441 gm. $Cd_4Bi_2Cl_3$ |
| 11 | 2.4502 gm. $CdBr_2$<br>3.7762 gm. $Cd_3Bi_2$<br>0.4180 gm. Bi | 500° C., 20 hrs. | 6.6444 gm. $Cd_4Bi_2Br_3$ |
| 12 | 3.2963 gm. $CdI_2$<br>3.7762 gm. $Cd_3Bi_2$<br>0.4180 gm. Bi | 520° C., 9 hrs. | 7.4905 gm. $Cd_4Bi_2I_3$ |

*Example 13*

Mixtures of stoichiometric quantities of the reactants calculated from the general equation of reaction set forth in line 17 of page 2 of this application were prepared and subjected to the process of Example 1 to form the following ternary semiconducting compounds:

$Cd_4N_2Cl_3$
$Cd_4N_2Br_3$
$Cd_4N_2I_3$
$Cd_4N_2F_3$
$Cd_4P_2F_3$
$Cd_4As_2F_3$
$Cd_4Sb_2F_3$
$Cd_4Bi_2F_3$

While the invention has been particularly shown and described with reference to the preferred embodiments thereof, it will be understood by those skilled in the art that various changes in form and details may be made therein without departing from the spirit and scope of the invention.

What is claimed is:

1. A ternary semiconducting compound having the formula $Cd_4Y_2X_3$ in which X is an element selected from the group consisting of $Cl_2$, $Br_2$ and $I_2$ and Y is an element selected from the post-transition subgroup of Group V of the Periodic Table.

2. A ternary semiconducting compound having the formula $Cd_4P_2Cl_3$.

3. A ternary semiconducting compound having the formula $Cd_4P_2Br_3$.

4. A ternary semiconducting compound having the formula $Cd_4P_2I_3$.

5. A ternary semiconducting compound having the formula $Cd_4As_2Br_3$.

6. A ternary semiconducting compound having the formula $Cd_4As_2I_3$.

7. A ternary semiconducting compound having the formula $Cd_4As_2Cl_3$.

8. The method of preparing a ternary semiconducting compound which comprises:

(1) mixing quantities of $CdX_2$, $Cd_3Y_2$, and Y in a 9:5:2 molar ratio in which X is an element selected from the group consisting of $Cl_2$, $Br_2$ and $I_2$ and Y is an element selected from the post-transition subgroup of Group V of the Periodic Table;

(2) heating the thus formed mixture in an evacuated sealed quartz tube at 500°–550° C. to form thereby a ternary compound having the formula $Cd_4Y_2X_3$.

9. The method of claim 8 wherein the quartz tube is placed in a temperature gradient so that the mixture can be heated at 500°–550° C. and single crystals of the compound $Cd_4Y_2X_3$ form at the empty cooler end of said quartz tube.

References Cited by the Examiner

UNITED STATES PATENTS 2,814,004 11/1957 Goodman.
3,140,998 7/1964 Folberth ---------- 23—14 X
3,208,878 9/1965 Donahoe ---------- 23—14 X

OTHER REFERENCES

Chem. Abstracts, volume 26, p. 1872 (Apr.–June 1932).

Chem. Abstracts, volume 59, p. 3416e (August. 1963).

OSCAR R. VERTIZ, *Primary Examiner.*

EDWARD STERN, *Examiner.*